2,779,668

EPOXY RESIN MODIFIED PHENOL RESIN ABRASIVE

Rupert S. Daniels, Union, and Anthony J. Mostello, Newark, N. J., assignors to Union Carbide and Carbon Corporation, a corporation of New York No Drawing. Application April 2, 1953, Serial No. 346,538

14 Claims. (Cl. 51—298)

This invention relates to new and improved compositions for the manufacture of abrasive products such as grinding wheels and coated abrasive products such as abrasive paper or abrasive cloth.

Numerous resins have been proposed as binding agents for abrasive wheels and papers. However, none of these have achieved the combination of desirable properties to be found in the binding agents of this invention.

For operational efficiency, a grinding wheel must have sufficient strength both at room temperature or slightly above as well as at the much higher operating temperatures. During the grinding operation, the perimeter of the wheel, which is in contact with the work, is frequently heated to high temperatures of 200° C. or more. The main portion of the wheel, however, ordinarily remains at a temperature of 25° C. or slightly above. The stresses placed on the wheel while in operation are very great and, therefore, a high flexural strength in the wheel at temperatures around 25° C. is as essential as high flexural strength at the much higher temperatures generated at the perimeter of the wheel.

In prior efforts to provide a satisfactory binding material for grinding wheels, the use of phenol resins for this purpose has been proposed. As will be seen from the examples, the use of phenolic resins alone does not produce flexural strength as high as is desirable for the wheels.

We have discovered that when a phenolic resin is combined in the proportions hereinafter set forth with certain epoxy resins, a composition is produced having much greater flexural strength at room temperatures than either a phenolic resin alone or an epoxy resin alone. The discovery of this unusual synergistic effect permits the production of abrasive wheels with strength characteristics which are useful at the high operating temperatures of the working perimeter of the wheel and with superior strength characteristics at the lower temperatures encountered in the main body of the wheel.

Our combination of phenolic resin and epoxy resin has also been found highly effective as coating compositions for making abrasive papers or cloths of various types. Used for this purpose, the resin combination of the invention has the advantage over other resins and binders of being unaffected by atmospheric conditions of moisture and temperature and in requiring only moderate curing temperatures.

In the practice of this invention, both the epoxy resin and the phenolic resin can be used in either the solid or the liquid state, the choice being based on the particular application of the resin. For abrasive papers or cloths, a liquid resin is desirable as such paper is made by a dipping and coating process. In the making of abrasive wheels, both types of resins have uses.

The phenolic resins employed in the invention are phenol-aldehyde condensates having reactive hydroxyl groups. It is essential, in the phenolic resin-epoxy resin mixture of the invention, that there be an excess of phenolic hydroxy groups over the number of epoxide groups in order to provide sufficient adhesion in the mixture. In the resin systems found preferable for forming the binding agent for abrasive wheels, a ratio of free phenolic hydroxy groups to free epoxy groups of between 7 to 1 and 80 to 1 is preferred. In the liquid resin system found preferable for use as the coating mixture for abrasive papers and cloths and the like, a ratio of free phenolic hydroxyl groups to free epoxy groups of between 3 to 1 and 15 to 1 is preferred.

On a weight basis, the ratio of volatile free phenol-formaldehyde resin to 100 percent by weight polyglycidyl ether can be between 1.2 to 1 (54 percent by weight of phenol-formaldehyde) and 80 to 1 (99 percent by weight of phenol-formaldehyde) for binding agents for abrasive wheels. In coating mixtures for abrasive papers or cloths, this ratio is between 2.2 to 1 (69 percent by weight of phenol-formaldehyde) and 10 to 1 (91 percent by weight of phenol-formaldehyde).

In preparing an abrasive wheel composition, a solid powdered novolak resin mixed with the proper amount of a methylene containing hardening agent is mixed with an epoxy resin. Abrasive grains or particles which have been previously coated with a wetting agent are then added. The wetting agent for the grains may be a liquid heat-hardenable phenolic resin or a resin solvent such as furfural or a mixture of furfural and cresol. In some cases, it is desirable to use some epoxy resin in the wetting agent, as this seems to increase the strength of the finished wheel. By using epoxy resin in large proportion in the wetting agent, it is possible to introduce all the epoxy resin desired in this manner, rather than by using solid epoxy resin mixed with the heat-hardenable phenol-formaldehyde resin of the main mixture.

In making a composition for coated abrasive products such as abrasive paper or cloth, a liquid one-step phenolic resin is mixed with a liquid epoxy resin and a basic hardening agent is usually added. Suitable hardening agents include tetra amines, amine adducts of the polyglycidyl ethers, and strongly basic substances such as sodium or potassium hydroxide. Normally, the hardener constitutes up to 10 percent by weight of the resin composition.

The solid phenol-formaldehyde resins preferred for the invention are of the novolak type to which has been added a sufficient amount of a methylene containing hardening agent such as hexamethylene tetra amine for the purpose of rendering them heat-hardenable.

The liquid phenol-formaldehyde resins preferred are of the one-step type prepared with an alkaline catalyst. These resins preferably contain only a small amount of water, 3 percent or less, and have a pH of 7.5 to 8.

The epoxy resins preferred are the solid or liquid polyglycidyl ethers prepared from the polyphenylol methanes prepared from phenol and formaldehyde or the polyphenylol dimethyl methanes prepared from acetone and phenol. The preparation of such resins is described in the examples which follow.

In the examples, the equivalent weight to epoxide groups is determined as follows. A one gram sample of the epoxide composition is heated with an excess of pyridine containing pyridine hydrochloride (made by adding 16 cc. of concentrated hydrochloric acid per liter of pyridine) at the boiling point for twenty minutes and back titrating the excess pyridine hydrochloride with 0.1 N sodium hydroxide, using phenolphthalein as an indicator and considering that one mol of hydrochloric acid is equivalent to one epoxide group.

EXAMPLE I

Bars of abrasive material were tested for flexural strength after being prepared in the following manner.

Abrasive grains were first coated with a liquid phenol-formaldehyde heat-hardenable resin and then mixed with a powdered blend of phenol-formaldehyde resin and epoxy type resins.

The abrasive used in these bars was a mixture of equal parts of No. 12, No. 14, and No. 16 aluminous oxide abasive grains. To 830 grams of this mixture was then added 30 grams of a liquid phenol-formaldehyde heat-hardenable resin, referred to here as "C," having a viscosity of 390 centipoises. This liquid phenol-formaldehyde resin is prepared by heating together at a temperature of 80° C. for 120 minutes, 100.00 parts of synthetic phenol, 31.25 pars of paraformaldehyde, and 0.625 part of caustic soda, which yields from 125 to 130 parts of liquid resin, containing approximately 3 percent water of reaction and from 13 to 14 percent free phenolic hydroxyl groups as calculated from a material balance, and having a pH of from 7.5 to 8. The abrasive grains and the liquid resin were mixed together in a pan at room temperature until all the grains of abrasive were uniformly coated with the resin, which required approximately 2 minutes.

After coating with the liquid resin, the abrasive was then added with stirring to a powdered blend of cryolite and a resin mixture. Sixty grams of powdered cryolite ($Na_3AlF_6$) were used and 80 grams of the powdered resin mixture. This resin mixture was made up of (X) grams of a heat-hardenable phenol-formaldehyde resin referred to here as "A" and (Y) grams of the polyglycidyl ether of a special bisphenol referred to here as "B." The heat-hardenable phenol-formaldehyde resin is made in the following manner: 100 parts of synthetic phenol, 72 parts of formaldehyde (37½ percent solution) and 0.56 part of oxalic acid were reacted and dehydrated to yield from 105 to 110 parts of a fusible, brittle solid resin which contains from 16 to 17 percent free phenolic hydroxyl groups as calculated from a material balance. Ninety and nine-tenths parts of this last mixture were ground together with 9.1 parts of a hardening agent, hexamethylene tetra amine into a fine powder, making the heat-reactable phenol formaldehyde resin, of which (X) grams were used.

The polyglycidyl ether of bisphenol is made as follows. A special bisphenol is made by reacting an excess of phenol and formaldehyde in the presence of hydrochloric acid. The resulting low melting point solid is substantially a mixture of the 2,2', the 2,4', and 4,4' isomeric bisphenols and a minor proportion of the tri- and tetra-(phenylolmethanes). Five hundred parts by weight of this special bisphenol which contains from 16 to 17 percent of free phenolic hydroxyl groups, as calculated from a material balance, is reacted with 1366 parts of epichlorhydrin and 245 parts of sodium hydroxide. The excess epichlorhydrin is distilled off and the resulting product is a liquid glycidyl ether having an equivalent weight to epoxide groups of from 175 to 185, as determined by the method given above immediately before the examples. The yield is about 150 parts of liquid glycidyl ether for every 100 parts of the special bisphenol used.

Two thousand and fifteen parts of this liquid glycidyl ether resin are then mixed with 918 parts of the special bisphenol and 80.8 parts of benzyl dimethyl amine and the whole is heated at a temperature of about 65° C. for about 24 hours. The resulting brittle, fusible solid resinous product has an equivalent weight to epoxide groups of 725, as determined by the method already given, and is here designated as "B."

After mixing together the abrasive coated with liquid resin, the cryolite, and the special resin mixture of "A" and "B" described in the last two paragraphs, a free flowing mixture was obtained. All of the resin powder and cryolite filler had been picked up on the abrasive grain surfaces, so that the outer surfaces were non-tacky.

142½ grams of the abrasive mixture were then placed in a bar mold cavity and a 6 inch x 1 inch x ½ inch bar was molded in a cold mold and press, using sufficient pressure to close the mold and thus obtain a pressed density of 47½ grams per cubic inch. Six bars which were molded from the mixture were placed on a porous vitrified plate in an electrically heated and controlled oven and baked on the following cycle:

| Temperature | Time |
| --- | --- |
| 80° F. to 175° F. | 20 minutes. |
| 175°–195° F. (10° F. rise per hour) | 2 hours. |
| at 195° F. | 12 hours. |
| 195°–215° F. (10° F. rise per hour) | 2 hours. |
| at 215° F. | 3 hours. |
| 215°–245° F. (10° F. rise per hour) | 3 hours. |
| at 245° F. | 3 hours. |
| 245°–285° F. (10° F. rise per hour) | 4 hours. |
| at 285° F. | 2 hours. |
| 285°–365° F. (10° F. rise per hour) | 8 hours. |
| at 365° F. | 9 hours. |
| Total | 48 hours 20 minutes. |

The bars were allowed to cool down in the oven overnight and were then removed from the oven for testing. Determination of the flexural strength of the bars was made at temperatures of 25° C. and 200° C., the bars having been divided into two sets of three for testing at the two temperatures. Each bar was placed flatwise on knife edges which were 5 inches apart, and the force to break was applied to the bar at the center of the span. The flexural strength of the bars was then calculated and the average value obtained for the three breaks for each of several concentrations (X) and (Y) of the two resins making up the 80 grams of powdered phenol resin mixture used.

| Mixture No. | Grams X of "A" | Grams Y of "B" | Grams of "C" | (1) (see below) | (2) (see below) | Flexural Strength, p. s. i. | |
| --- | --- | --- | --- | --- | --- | --- | --- |
| | | | | | | 25° C. | 200° C. |
| 1 | 80 | 0 | 30 | | | 3,730 | 3,030 |
| 2 | 72 | 8 | 30 | 12.7–1 | 77–1 | 5,200 | 2,870 |
| 3 | 60 | 20 | 30 | 4.5–1 | 27–1 | 5,587 | 1,990 |
| 4 | 40 | 40 | 30 | 1.75–1 | 10.5–1 | 6,177 | 920 |
| 5 | 0 | 80 | 30 | 0.38–1 | 2.2–1 | 4,927 | 169 |

[1] Weight ratio of phenolic resin to polyglycidyl ether resin: $\frac{X + \text{Gram of "}C\text{"}}{Y}$

[2] Ratio of free phenolic hydroxyl groups to free epoxy groups.

The compositions described in the above table are suitable as binding agents for abrasive wheels used for coarse grinding applications such as the snagging of stainless steel billets. It is apparent from the table that as the proportion of polyglycidyl ether resin is increased, the flexural strength of the abrasive bars at high temperatures decreases in proportion. However, at room temperature, bars having as a binding agent a blend of phenolic resin and polyglycidyl ether resin exhibit a synergistically greater flexural strength than do bars having either resin alone as a binding agent.

In applications where high strength both at room and at elevated temperatures is desired, a composition such as mixture No. 2 above is most useful. If strength at room temperature is of main importance, then a composition such as mixture No. 4 is more desirable. Mixture No. 3 is an intermediate mixture. It can further be seen from the table that both mixture No. 1 (straight phenol-formaldehyde resins) and mixture No. 5 (predominantly polyglycidyl ether resin), both of which are outside the limits of the invention, have greatly inferior strength characteristics.

EXAMPLE II

Bars of abrasive material were tested for flexural strength after being prepared in the following manner. Abrasive grains were first coated with a liquid phenol-formaldehyde heat-hardenable resin and then mixed with a powdered blend of phenol-formaldehyde and phenolic epoxy type resins.

The abrasive used in these bars was a mixture of equal parts of No. 12, No. 14, and No. 16 aluminous oxide abrasive grains. To 830 grams of this mixture was then added 30 grams of a liquid phenol-formaldehyde heat-hardenable resin, referred to as "C" in Example I.

The abrasive grains and the liquid resin were mixed together in a pan at room temperature until all the grains of abrasive were uniformly coated with the resin, which required approximately two minutes.

The abrasive coated with liquid resin was then added with stirring to a powdered blend of cryolite and a phenolic resin mixture. 60 grams of powdered cryolite ($Na_3AlF_6$) were used and 80 grams of the powdered phenolic resin mixture. This resin mixture was made up of (X) grams of a heat-hardenable phenol-formaldehyde resin referred to as "A" in Example I and (Y) grams of the polyglycidyl ether of a special bisphenol referred to here as "D."

The polyglycidyl ether "D" for this example was made in the following manner: 228 parts of a commercial grade bisphenol, which is about 94 percent 4,4' dihydroxydiphenyldimethyl methane and made by reacting acetone and phenol, are combined with 555 parts of epichlorhydrin and 94 parts of sodium hydroxide, with a small amount of water and alcohol as solvents. These materials are condensed at 80°–100° C. and the sodium chloride formed is removed by washing with water. The solvents and excess epichlorhydrin are recovered. A washed residue of 319 parts is obtained and to this is added 150.4 parts of the special bisphenol and 2.35 parts of potassium hydroxide. The solution is heated below 80° C. and held at 60° C. until a solid brittle resin is obtained with a test gel time of two minutes at 160° C. The brittle resin is cooled and finely ground and contains an epoxide equivalent weight of 725, as determined by the method given before these examples. After mixing together the liquid resin-coated abrasive, the cryolite, and the special phenolic resin mixture of "A" and "D" described in the last two paragraphs, a free-flowing mixture was obtained. All of the resin powder and cryolite filler had been picked up on the abrasive grain surfaces, so that the outer surfaces were non-tacky.

142½ grams of the abrasive mixture were then placed in a bar mold cavity and a 6 inch x 1 inch x ½ inch bar was molded in a cold mold and press using sufficient pressure to close the mold and thus obtain a pressed density of 47½ grams per cubic inch. Six bars which were molded from the mixture were placed on a porous vitrified plate in an electrically heated and controlled oven and baked on the following cycle:

| Temperature | Time |
| --- | --- |
| 80° F. to 175° F. | 20 minutes. |
| 175°–195° F. (10° F. rise per hour) | 2 hours. |
| at 195° F. | 12 hours. |
| 195°–215° F. (10° F. rise per hour) | 2 hours. |
| at 215° F. | 3 hours. |
| 215°–245° F. (10° F. rise per hour) | 3 hours. |
| at 245° F. | 3 hours. |
| 245°–285° F. (10° F. rise per hour) | 4 hours. |
| at 285° F. | 2 hours. |
| 285°–365° F. (10° F. rise per hour) | 8 hours. |
| at 365° F. | 9 hours. |
| Total | 48 hours 20 minutes. |

The bars were allowed to cool down in the oven overnight and were then removed from the oven for testing. Determination of the flexural strength of the bars was made at temperatures of 25° C. and 200° C., the bars having been divided into two sets of three for testing at the two temperatures. Each bar was placed flatwise on knife edges which were 5 inches apart, and the force to break was applied to the bar at the center of the span. The flexural strength of the bars was then calculated and the average value obtained for the three breaks for each of several concentrations (X) and (Y) of the two resins making up the 80 grams of powdered phenolic resin mixture used.

| Mixture No. | Grams X of "A" | Grams Y of "D" | Grams of "C" | (1) (see below) | (2) (see below) | Flexural Strength, p. s. i. | |
| --- | --- | --- | --- | --- | --- | --- | --- |
| | | | | | | 25° C. | 200° C. |
| 1 | 80 | 0 | 30 | | | 4,600 | 3,550 |
| 2 | 72 | 8 | 30 | 12.7–1 | 77–1 | 5,480 | 3,770 |
| 3 | 60 | 20 | 30 | 4.5–1 | 27–1 | 7,070 | 2,460 |
| 4 | 40 | 40 | 30 | 1.75–1 | 10.5–1 | 5,100 | 781 |
| 5 | 0 | 80 | 30 | 0.38–1 | 2.2–1 | 2,270 | 52 |

[1] Weight ratio of phenolic resin to polyglycidyl ether resin:
$$\frac{X + \text{Grams of ``C''}}{Y}$$

[2] Ratio of free phenolic hydroxyl groups to epoxy groups.

It can be seen from the above table that abrasive bars made with a binding agent consisting of a blend of phenolic resin and polyglycidyl ether resin (mixture Nos. 2, 3, and 4) have a higher flexural strength at 25° C. than those abrasive bars made with a binding agent consisting of either resin alone.

EXAMPLE III

A series of abrasive bars were made up using the materials and technique of Example II. These bars differed only in that a small amount of a diglycidyl ether of a special bisphenol was used in the wetting agent employed to wet the abrasive grains. Instead of adding to the abrasive grains 30 grams of a liquid phenol-formaldehyde resin, as described in paragraph two of Example I and referred to as "C," there was added a mixture of 27 grams of the liquid phenol-formaldehyde resin "C" mixed with 3 grams of a liquid diglycidyl ether of a special bisphenol, this mixture being referred to here as "E." In all other respects, mixtures 1 through 4 of this example correspond with mixtures 1 through 4 of Example I. Mixture 1a is mixture 1 of Example I, using "C" instead of "E" as in this example, and is given by way of contrast.

The diglycidyl ether of which 3 grams were used in the wetting agent "E" of this example was made in the following manner:

A special bisphenol, a mixture of the 2,2', the 2,4', and the 4,4' isomers, is made by reacting an excess of phenol with formaldehyde in the presence of HCl. This special bisphenol (500 parts) is reacted with an excess of epichlorhydrin (1366 parts) and enough NaOH (245 parts) to equal the phenolic hydroxyls present. The excess epichlorhydrin is distilled off; water, alcohol, and toluene may be used as solvent aids. The yield is 150 parts of liquid glycidyl ether per 100 parts of the special bisphenol used. The glycidyl ether has an equivalent weight to epoxide groups of between 175 and 185, as determined by the method given before these examples.

The flexural strengths obtained for samples of this example, using the methods of Example I are shown below:

| Mixture No. | Grams X of "A" | Grams Y of "B" | Grams of "E" [3] | (1) (see below) | (2) (see below) | Flexural Strength, p. s. i. | |
| --- | --- | --- | --- | --- | --- | --- | --- |
| | | | | | | 25° C. | 200° C. |
| 1 | 80 | 0 | 30 | 36–1 | 53–1 | 4,433 | 2,490 |
| 1a | 80 | 0 | [3] 30 | | | 3,730 | 3,070 |
| 2 | 72 | 8 | 30 | 9–1 | 30–1 | 4,663 | 2,340 |
| 3 | 60 | 20 | 30 | 3.75–1 | 16–1 | 5,720 | 1,660 |
| 4 | 40 | 40 | 30 | 1.56–1 | 7.8–1 | 6,187 | 825 |

[1] Weight ratio of phenolic resin to polyglycidyl ether resin.
[2] Ratio of free phenolic hydroxyl groups to free epoxy groups.
[3] In mixture 1a, which is mixture 1 of Example I, 30 grams of "C," rather than of "E," were used.

Comparison of mixture 1a, in which the abrasive bars were made with a binding agent consisting of only a phenolic resin, with mixture 1, in which a small amount (3 grams) of epoxy resin was added to 27 grams of phenolic resin wetting agent used in preparing the bars illustrates the marked increase in flexural strength at room temperatures obtained in bars containing only a small amount of epoxide resin.

EXAMPLE IV

A resin-abrasive mixture for coated products such as sandpaper was made in the following manner:

A liquid phenol-formaldehyde resin made by combining 100 parts by weight of phenol, 150 parts of 37½ percent solution of formaldehyde, 6 parts of barium hydroxide, and 1.75 parts sulphuric acid, yielding from 150 to 170 parts of a liquid resin having a viscosity of 1250 centipoises, and which will heat harden at 121° C. in 18.5 minutes. The solids content of such a resin is from 76 to 83 percent and it contains from 10 to 13 percent phenolic hydroxyl groups based on a material balance.

(R) parts by weight of the liquid phenol-formaldehyde resin described above are then mixed with (S) parts by weight of a diglycidyl ether of bisphenol and (T) parts of an amine adduct of this same diglycidyl ether as a hardener. The diglycidyl ether of bisphenol is made as follows: A special bisphenol, a mixture of the 2,2′, the 2,4′, and the 4,4′ isomers is made by reacting an excess of phenol with formaldehyde in the presence of HCl. This special bisphenol (500 parts) is reacted with an excess of epichlorhydrin (1366 parts) and enough NaOH (245 parts) to equal the phenolic hydroxyls present. The excess epichlorhydrin is distilled off; water, alcohol, and toluene may be used as solvent aids. The yield is 150 parts of liquid glycidyl ether per 100 parts of the special bisphenol used.

The amine adduct of the diglycidyl ether of bisphenol used above is made by combining 83.3 parts of the polyglycidyl ether with 100 parts of a hardener, diethylenetriamine, at 40° C. The mixture self-heats and so the polyglycidyl ether is added slowly to control the heat at a temperature of about 75° C. The resulting resin is a viscous liquid.

The liquid resin mixture, which can be rendered more fluid, if desired, by the addition of solvents, such as furfural, the monoethyl ether of ethylene glycol, ethanol and the like, is then coated on paper, and grains of aluminous oxide or other suitable abrasive are added by a suitable method such as dropping them onto the coated paper or projecting them up to the coated paper through an electrostatic field in order to orientate the grains on their longest axes. At this point, the paper may be cured directly, or a second light coat of resin may be applied for the purpose of further anchoring the grains to the first coat.

The following table illustrates three compositions of the invention (mixtures 1, 2, and 3) suitable for use in making abrasive products such as abrasive paper and abrasive cloth. By way of contrast, two compositions (mixtures 4 and 5) which are unworkable and which fall outside the limits of the invention, are shown.

*Composition and ratio*

| Mixture No. | "R" Grams Phenol-Formaldehyde Resin | 100% Equivalent of "R" in grams | "S" Grams of liquid glycidyl ether | "T" Grams of hardeners | (¹) (see below) | (²) (see below) |
|---|---|---|---|---|---|---|
| 1 | 90 | 72 | 10 | 6 | 7.3-1 | 10.7-1 |
| 2 | 85 | 68 | 15 | 6 | 4.5-1 | 6.7-1 |
| 3 | 75 | 60 | 25 | 6 | 2.4-1 | 3.6-1 |
| 4 | 66.7 | 53.3 | 33.3 | 6 | 1.6-1 | 2.4-1 |
| 5 | 50 | 40 | 50 | 6 | 0.8-1 | 1.2-1 |

PHYSICAL PROPERTIES

| Mixture No. | Time in Minutes for— | | | |
|---|---|---|---|---|
| | Pot Life | | Drying Time | |
| | 100° F. | 140° F. | 100° F. | 140° F. |
| 1 | 480 | 120 | 520 | 180 |
| 2 | 360 | 90 | 480 | 120 |
| 3 | 60 | 30 | 480 | 50 |
| 4 | Incompatible | | | |
| 5 | Incompatible | | | |

¹ Weight ratio of 100 percent phenolic resin to liquid epoxy resin.
² Ratio of free phenolic hydroxyl groups to free epoxy groups.

From the table, it can be seen that, depending on the application desired, a composition can be mixed having a long pot life and a slow set time or having a short pot life and a short set time. Pot life can be defined as the length of time a mixture will remain liquid in a container and set time as the time required for the composition to set or become hard when applied to a sheet of backing material.

Compositions of the invention suitable for such applications fall within the weight ratios of phenol-formaldehyde resin to polyglycidyl ether resin of from 2.2 to 1 to 10 to 1. Mixtures 1, 2, and 3 are typical of such suitable compositions. Compositions in which the weight proportion of polyglycidyl ether resin to phenolic resin is less than one part in eleven are too slow setting for all practical purposes.

Compositions in which the weight proportion of polyglycidyl ether to phenolic resin is greater than one part in three, as in mixtures 4 and 5 of the table, are nonhomogeneous compositions. When mixed in such proportions, the two liquid resins form incompatible mixtures unsuitable for coated abrasive products.

We claim:

1. A composition for abrasive grinding wheels comprising abrasive particles and as a binder therefor an amount of a liquid wetting agent sufficient to wet thoroughly the particles, said wetting agent being at least one selected from the group consisting of furfural, cresol, a liquid heat-hardenable phenol-formaldehyde resin, and a fusible glycidyl ether of a polyphenylol methane, combined with a mixture of a heat-hardenable phenol-formaldehyde resin and a fusible glycidyl ether of a polyphenylol methane, the percentage of said phenol-formaldehyde resin in said mixture varying from 54 to 99 percent by weight, and the ratio of free phenolic hydroxyl groups to epoxy groups in the resin mixture being greater than 7 to 1.

2. A composition according to claim 1 in which the liquid wetting agent is furfural.

3. A composition according to claim 1 in which the liquid wetting agent is a liquid phenol-formaldehyde heat-hardenable resin.

4. A composition according to claim 1 in which the liquid wetting agent is a liquid glycidyl ether of a polyphenylol methane.

5. A composition according to claim 1 in which the liquid wetting agent is a mixture of furfural and cresol.

6. A composition according to claim 1 in which the liquid wetting agent is a mixture of liquid glycidyl ether of a polyphenylol methane and a liquid heat-hardenable phenol-formaldehyde resin.

7. A composition for coated abrasive products which comprises abrasive particles and as a binder therefor a resin mixture of from 69 to 91 percent by weight of a heat-hardenable phenol-formaldehyde resin and from 9 to 31 percent by weight of a fusible glycidyl ether of a polyphenylol methane, to which is added a basic hardener in an amount up to 10 percent by weight of the resin mixture, and the ratio of free phenolic hydroxyl groups to epoxy groups in said resin mixture being greater than 3 to 1.

8. A method for producing molded abrasive articles which comprises wetting abrasive particles with an amount of a liquid wetting agent sufficient to wet thoroughly said particles, said wetting agent being at least one selected from the group consisting of furfural, cresol, a liquid heat-hardenable phenol-formaldehyde resin, and a fusible glycidyl ether of a polyphenylol methane, and then mixing said wetted particles into a mixture of a heat-hardenable phenol-formaldehyde resin and a fusible glycidyl ether of a polyphenylol methane, the percentage of said phenol-formaldehyde resin in said mixture varying from 54 to 99 percent by weight, and the ratio of free phenolic hydroxyl groups to epoxy groups in said resin mixture being greater than 7 to 1, and then molding the mixture of wetted grains and resins into an object of the desired shape, and then baking said molded, shaped object so as to render the resin bond infusible.

9. A method according to claim 8 in which the liquid wetting agent is furfural.

10. A method according to claim 8 in which the liquid wetting agent is a liquid phenol-formaldehyde heat-hardenable resin.

11. A method according to claim 8 in which the liquid wetting agent is a mixture of furfural and cresol.

12. A method according to claim 8 in which the liquid wetting agent is a liquid glycidyl ether of a polyphenylol methane.

13. A method according to claim 8 in which the liquid wetting agent is a mixture of liquid glycidyl ether of a polyphenylol methane and a liquid heat-hardenable phenol-formaldehyde resin.

14. A composition for abrasive products which comprises abrasive particles and a resin mixture of from 54 to 99 percent by weight of a heat-hardenable phenol formaldehyde resin and from 1 to 46 percent by weight of a fusible glycidyl ether of a polyphenylol methane, the ratio of free phenolic hydroxyl groups to epoxy groups in said resin mixture being greater than 3 to 1.

References Cited in the file of this patent

UNITED STATES PATENTS

| | | |
|---|---|---|
| 2,506,486 | Bender et al. | May 2, 1950 |
| 2,521,911 | Greenlee | Sept. 12, 1950 |
| 2,559,665 | Ries et al. | July 10, 1951 |
| 2,563,774 | Debing | Aug. 7, 1951 |

OTHER REFERENCES

Shell: Article in Paint, Oil and Chemical Review, pages 15–18, and 49, Nov. 9, 1950.